United States Patent [19]

Waddill et al.

[11] 4,147,857

[45] Apr. 3, 1979

[54] EPOXY CURE WITH POLYAMINE-POLYETHER SUCCINIMIDE SYSTEMS

[75] Inventors: Harold G. Waddill; Heinz Schulze, both of Austin, Tex.

[73] Assignee: Texaco Development Corp., New York, N.Y.

[21] Appl. No.: 891,790

[22] Filed: Mar. 30, 1978

[51] Int. Cl.$^2$ .................... C08G 59/56; C08G 59/46
[52] U.S. Cl. ........................... 528/94; 528/88; 528/93; 528/111; 528/135; 528/322; 528/367; 528/368; 260/326.4
[58] Field of Search ............... 528/111, 135, 407, 88, 528/93, 94, 322, 367, 368; 260/830 R

[56] References Cited

U.S. PATENT DOCUMENTS

| | | | |
|---|---|---|---|
| 3,324,176 | 6/1967 | Kirschnek | 260/553 |
| 3,462,393 | 8/1969 | Legler | 260/47 |
| 3,660,316 | 5/1972 | Schaefer et al. | 260/2 N |
| 3,717,612 | 2/1973 | Babayan | 260/47 EN |
| 3,730,948 | 5/1973 | Akiyama et al. | 260/47 EC |
| 3,875,113 | 4/1975 | Lefebvre et al. | 260/47 EN |
| 4,002,598 | 1/1977 | Waddill et al. | 260/47 EN |

*Primary Examiner*—Harold D. Anderson
*Assistant Examiner*—E. A. Nielsen
*Attorney, Agent, or Firm*—Carl G. Ries; Thomas H. Whaley; Kenneth R. Priem

[57] ABSTRACT

An adhesively superior epoxy resin composition comprises a vicinal polyepoxide, a curing amount of an amine curing agent, and an effective amount of an additive comprising a polyoxyalkylenepolyamine-maleic anhydride condensation product having thioureide, ureide or thioformamide or formamide end groups.

19 Claims, No Drawings

EPOXY CURE WITH POLYAMINE-POLYETHER SUCCINIMIDE SYSTEMS

BACKGROUND OF THE INVENTION

1. Field of the Invention

This invention relates to curable epoxy resins having increased adhesive strength; and, more particularly, to amine cured epoxy resins containing certain diamide additives.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents are generally the amines. The most commonly used amine curing agents are aliphatic amines such as diethylenetriamine, triethylenetetramine and the like and/or polyoxyalkylene polyamines; such as polyoxypropylenediamines and triamines.

Epoxy resin compositions having improved physical properties are obtained by employing polyoxyalkyleneamines, and polyoxyalkylenediamines in particular, as curing agents. It is common to employ with such epoxy resin compositions a co-curing agent such as those described in U.S. Pat. No. 3,549,592.

Also known to be effective as epoxy curing agents or co-curing agents are various ureas and substituted ureas, such as those disclosed in U.S. Pat. Nos. 3,294,749, 2,713,569, 3,386,956, 3,386,955, 2,855,372 and 3,639,338. The ureas disclosed in the above references are useful as either curing agents or as curing accelerators.

Aliphatic or aromatic compounds having a single terminal ureido group are well known. It has been disclosed in U.S. Pat. No. 2,145,242 to Arnold that di-ureido terminated aliphatic compounds can be produced by reacting an aliphatic diamine wherein each terminal amine has at least one labile hydrogen with urea. Other substituted ureas are disclosed in U.S. Pat. No. 3,965,072.

Diureide terminated polyoxyalkylene material provides cured epoxy resin compositions exhibiting outstanding strength of adhesion as disclosed in our co-pending application Ser. No. 743,814 filed Nov. 22, 1976.

It has been surprisingly discovered that cured epoxy resins having outstanding tensile shear strength can be obtained by using an additive comprising a polyoxyalkylenepolyamine-maleic anhydride condensation product. The cured epoxy resin compositions of the instant invention are useful as coatings, castings, sealants and especially adhesives.

SUMMARY OF THE INVENTION

According to the broad aspect of the instant invention, the adhesive strength of amine-cured epoxy resins is enhanced by the addition of an effective amount of an additive comprising a polyoxyalkylenepolyamine-maleic anhydride condensation product having thioureide, ureide or thioformamide or formamide end groups.

In one aspect, a curable epoxy resin composition having superior adhesive strength comprises a vicinal polyepoxide, a curing amount of an amine curing agent and an effective amount of an additive made by reacting urea with polyoxyalkylenepolyamine-succinimide.

In accordance with a preferred embodiment, a diglycidyl ether of 4,4'-isopropylidene bisphenol, a curing amount of a primary amine-containing curing agent consisting essentially of a polyoxypropylene polyamine having a molecular weight of from about 200 to 400 and an effective amount of an additive made by reacting urea with polyoxyalkylenepolyamine succinimide are utilized to form a resin.

DETAILED DESCRIPTION OF THE INVENTION

According to the instant inventive concept, blends of a polyepoxide, an amine curing agent and a diamide of a polyoxyalkylenepolyamine-urea condensate and, optionally, an accelerator are thoroughly admixed and cured in accordance with conventional methods to provide cured epoxy resins having unexpectedly superior adhesive strength.

Generally the vicinal polyepoxide containing compositions which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihyroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The amine curing agents which can be utilized in accordance with the instant invention are generally any of those amine curing agents which are well known to be useful for the curing of vicinal epoxides. Generally, those curing agents having at least three reactive amino hydrogens are useful.

Exemplary of those amines which can be utilized are alkylene polyamines such as diethylene triamine, triethylene tetramine and the like; oxyalkylene polyamines such as polyoxypropylene, di- and triamine and diamino derivatives of ethylene glycol, such as 1,13-diamino 4, 7,10-trioxatridecane.

Additionally, aromatic amine curing agents are useful, such as the alkylene-linked polyphenyl amines, phenylene diamines and polycyclic or fused aromatic primary amine compounds. Additionally the corresponding cycloaliphatic compounds can be used.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

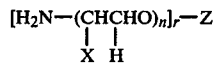

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylene polyamines are the polyoxypropylene diamines wherein X is a methyl radical, n is a number from 1 to 10, Z is a 1,2-propylene radical and r is about 2. These polyoxyalkylene polyamines can be prepared by known methods as disclosed in U.S. Pat. No. 3,236,895 and U.S. Pat. No. 3,654,370. The most preferred polyoxyalkylene polyamine is a polyoxypropylene diamine having a molecular weight of about 230.

Another preferred class of polyoxyalkylene polyamines can be depicted by the formula:

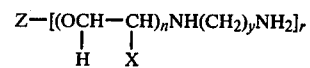

wherein X, Z, n and r are defined as above and y is 2 or 3. These poly(aminoalkylamino)polyethers are the hydrogenated product of the cyanoalkylated adduct of a polyoxyalkylene polyamine as above described. The preparation of the cyanoalkylated adducts is described in U.S. Pat. No. 3,666,788 issued to Rowton, May 30, 1972.

The succinimide additive may be described as a polyoxyalkylenepolyamine-maleic anhydride condensation product having thioureide or ureide or thioformamide or formamide end groups as represented by the following formula:

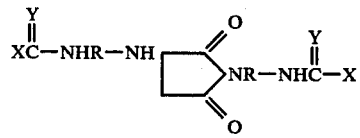

where
Y is S or O
X is NH$_2$ or H and
R is a polyoxyalkylene radical.

A preferred additive as above wherein Y is O and X is NH may be made by reacting urea with polyoxyalkylenepolyamine-succinimide at elevated temperatures until the evolution of ammonia is complete.

In accordance with this method, the reactants are simply admixed in correct molar ratios in a suitable reaction vessel and heated, if necessary, until the reaction occurs.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7–14 describes the use of certain amine-containing compounds as epoxy curing agent-accelerators.

Many accelerators are known in the art which can be utilized in accordance with the instant invention. Examples include salts of phenols; salicyclic acids; amine salts of fatty acids such as those disclosed in U.S. Pat. No. 2,681,901; and, tertiary amines such as those disclosed in U.S. Pat. No. 2,839,480. A preferred accelerator in accordance with the instant invention is disclosed in U.S. Pat. No. 3,875,072 issued to G. Waddill, Apr. 1, 1975. The accelerator comprises a combination of piperazine and an alkanol amine in a weight ratio of about 1:8 to 1:1.

According to the method of the instant invention, the adhesion properties of prior art amine-cured epoxy resins are enhanced by the addition of an effective amount of an additive comprising a polyoxyalkylenepolyamine-maleic anhydride condensation product having thioureide, ureide or thioformamide or formamide end groups as hereinbefore described. The amount of additive effective in bringing about the increased adhesive property is somewhat empirical and will depend upon the resin, the amine curing agent, and the use of an accelerator. Generally, the additive can be utilized in amounts from about 2 to about 40 parts by weight based on one hundred parts by weight of the resin constituent.

Preferably the adhesive properties of prior art resins are enhanced by addition of an effective amount of the succinimide additive based upon the condensation urea with polyoxyalkylenepolyamine succinimide. The preferred resins comprise polyglycidyl ethers of a polyhydric phenols cured by incorporating therein a curing amount of a polyoxyalkylenepolyamine of molecular weight from about 200 to 500 and, optionally, an accelerator combination of piperazine and an alkanolamine, the combination having a combined weight ratio of between about 1:8 to 1:1. Exemplary preferred prior art compositions can be enhanced in accordance with the instant invention are disclosed in U.S. Pat. No. 3,943,104 issued Mar. 9, 1976 to G. Waddill.

The amine cured resins having superior adhesion in accordance with the instant invention are prepared in a conventional manner. The amine curing agent is admixed with the polyepoxide composition in amounts according to the amine equivalent weight of the curing agent employed. Generally the number of equivalents of amine groups is from about 0.8 to about 1.2 times the number of epoxide equivalents present in the curable epoxy resin composition, with a stoichiometric amount being preferred. When using an accelerator, amounts from 1 to about 10 parts by weight based on 100 parts by weight of the resin are generally satisfactory. The exact amount of constituents in accordance with the above general requirements will depend primarily on the application for which the cured resin is intended.

The succinimide additive is incorporated into the uncured resin by admixing. Preferably, the additive is first admixed with the curing agent and/or the accelerator prior to addition to the resin. The constituents forming the curable material are then intimately admixed by standard methods and degassed in the presence of a commercial defoamer and minute amounts of silicone oils to prevent voids and bubbles.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and more preferably 100% by weight has been shown to greatly enhance the desirable properties of the cured material, especially the adhesive strength.

Preferred amine curing agents are those polyamines having amine equivalent weight of from 20 to about 150. Examples of such agents include polyoxypropylenediamines having a molecular weight in the range of 200 to 500 and polyoxypropylenepolyamines having a molecular weight of from about 400 to 700.

Generally, the mixture of epoxy resin, the succinimide additive, polyoxyalkylene polyamine, and (optionally) the accelerator combination of piperazine and alkanolamine is allowed to self-cure at ambient temperatures of between 0° C to about 45° C. However, it has been found expeditious that the mixture be cured or post-cured at elevated temperatures of up to about 135° C.

It will further be realized that various conveniently employed additives can be admixed with the polyepoxide containing composition of the instant invention prior to final cure. For example, in certain instances it may be desired to add minor amounts of other polyalkyleneamine co-catalysts as herein described, or hardeners along with various other accelerators and curing agent systems well known in the art.

Additionally, conventional pigments, dyes, fillers, flame retarding agents and the like which are compatible, natural or synthetic resins can be added.

Furthermore, although not preferred, known solvents for polyepoxide materials such as toluene, benzene, xylene, dioxane, ethylene glycol monomethylether and the like can be used.

The compositions of the instant invention can be used as impregnants, surface coatings, pottings, capsulating compositions, laminates, and, particularly and most importantly, as adhesives for bonding metallic elements or structures permanently together.

The following examples illustrate the nature of the instant invention but are not intended to be limitative thereof.

EXAMPLE 1

Preparation of Bis(Urea) of JEFFAMINE ® D-2000 Succinimide

A mixture of JEFFAMINE ® -2000 succinimide (4942-73; total amine 0.64 meq./g., primary amine 0.43 meq./g., 290 g., 0.0775 moles) and urea (10 g., 0.167 moles) was heated at 130°–135° C. until evolution of NH was completed. The product was then vacuum stripped at 120°–130° C./40MM. The product analyzed as follows — total amine 0.14 meq./g., primary amine 0.12 meq./g.

[1] 3(ω-aminopolyoxyalkyleneamineamino)-N-ω-aminopolyoxyalkylene) succinimide. JEFFAMINE ® D-2000 is polyoxypropylenepolyamine of about 2000 MW.

EXAMPLE 2

Properties of Epoxy Resin Cured with Blends of JEFFAMINE ® D-230[1] and the Bis(Urea) of JEFFAMINE ® D-2000 Succinimide

|  | A | B | C | D | E |
|---|---|---|---|---|---|
| Amt. of D-2000 succinimide Bis(Urea), phr. | 0 | 2 | 5 | 10 | 20 |
| Amt. of curative, phr. | 30 | 30 | 30 | 30 | 30 |
| Tensile shear strength, psi | 980 | 3560 | 4050 | 4230 | 3530 |
| Peel strength, pli | 7.6 | 10.0 | 14.9 | 23.6 | 27.1 |

[1] Polyoxypropylene diamine of MW 230(curative) Test samples in all Examples cured 7 days at room temperature

EXAMPLE 3

Properties of Epoxy Resin Cured with Blends of JEFFAMINE ® D-400[1] and the Bis(Urea) of JEFFAMINE ® D-2000 Succinimide

|  | A | B | C |
|---|---|---|---|
| Amt. of D-2000 succinimide Bis(Urea), phr. | 0 | 5 | 10 |
| Amt. of curative, phr. | 50 | 50 | 50 |
| Tensile shear strength, psi | 2500 | 2600 | 3350 |

[1] Polyoxypropylenediamine of MW 400 (curative)

EXAMPLE 4

Properties of Epoxy Resin Cured with Blends of JEFFAMINE®T-403[2] and the Bis(Urea) of JEFFAMINE® D-2000 Succinimide

|  | A | B | C |
|---|---|---|---|
| Amt. of D-2000 succinimide Bis(Urea), phr. | 0 | 5 | 10 |
| Amt. of curative, phr. | 45 | 45 | 45 |
| Tensile shear strength, psi. | 1400 | 3700 | 4000 |

[2]Polyoxypropylene triamine of MW 403 (curative)

EXAMPLE 5

Properties of Epoxy Resin Cured with Blends of (curative Diethylene Glycol Bis(Propylamine) and the Bis(Urea) of JEFFAMINE® D-2000 Succinimide

|  | A | B | C |
|---|---|---|---|
| Amt. of D-2000 succinimide Bis(Urea), phr. | 0 | 5 | 10 |
| Amt. of curative, phr | 30 | 30 | 30 |
| Tensile shear strength, psi. | 1570 | 3610 | 4040 |

EXAMPLE 6

Properties of Epoxy Resin Cured with Blends of (curative) Triethylenetetramine and the Bis(Urea) of JEFFAMINE® D-2000 Succinimide

|  | A | B |
|---|---|---|
| Amt. of D-2000 succinimide Bis(Urea), phr. | 0 | 10 |
| Amt. of curative, phr. | 12 | 12 |
| Tensile shear strength, psi | 800 | 1980 |

We claim:

1. An epoxy resin composition having superior adhesion properties and being the cured product of a curable admixture which comprises:
   a vicinal polyepoxide having an average of at least 1.8 reactive 1,2-epoxy groups per molecule;
   a curing amount of a polyamine curing agent having at least 3 reactive amino hydrogens; and,
   an effective amount of a succinimide additive comprising a polyoxyalkylenepolyamine-maleic anhydride condensation product having (thioureide), ureide or thioformamide or formamide end groups.

2. The composition of claim 1 further comprising an effective amount of a composition effective in accelerating the cure.

3. The composition of claim 1 wherein said polyamine curing agents are of the formula

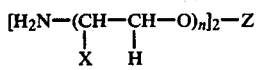

wherein X is hydrogen, a methyl radical or an ethyl radical; Z is a hydrocarbon alkylene radical having from 2 to 5 carbon atoms; and, n is an average number of from about 2 to about 15.

4. The composition of claim 3 wherein X is a methyl radical.

5. The composition of claim 1 wherein the succinimide is of the formula:

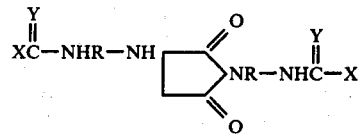

where
Y is S or O
X is NH$_2$ or H and
R is a polyoxyalkylene radical.

6. The composition of claim 5 wherein X is NH$_2$ and Y is O.

7. The composition of claim 1 wherein said vicinal polyepoxide is more than 80% by weight of a polyglycidyl ether of polyhydric phenols.

8. The composition of claim 7 wherein said vicinal polyepoxide is a polyglycidyl ether of a polyhydric phenol.

9. A method for increasing the adhesive strength of an epoxy resin composition, being the cured product of a curable admixture comprising a vicinal polyepoxide having an average of at least 1.8 reactive 1,2-epoxy groups per molecule; and, a curing amount of a polyamine curing agent having at least 3 reactive amino hydrogens comprising the step of:
   adding to said curable admixture an effective amount of an additive comprising a polyoxyalkylenepolyaminemaleic anhydride condensation product having thioureide, ureide or thioformamide or formamide end groups.

10. The method of claim 9 wherein the succinimide additive is of the formula:

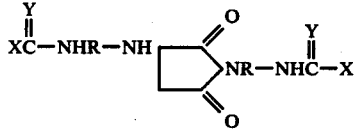

where
Y is S or O
X is NH$_2$ or H and
R is a polyoxyalkylene radical.

11. The method of claim 10 wherein X is NH$_2$ and Y is O.

12. The method of claim 10 wherein R' is a polyoxypropylamine radical.

13. The method of claim 10 wherein said curable admixture further comprises an effective amount of a composition effective in accelerating the cure.

14. The method of claim 10 wherein said vicinal polyepoxide is more than 80% by weight of a polyglycidyl ether of polyhydric phenols.

15. The method of claim 14 wherein said vicinal polyepoxide is a polyglycidyl ether of a polyhydric phenol.

16. A curable resin composition comprising a diglycidyl ether of 4,4'-isopropylidene bisphenol polyepoxide; a curing amount of a primary amine-containing curing agent consisting essentially of a polyoxypropylene diamine having a molecular weight of from about 200 to 250 and, an effective amount of an additive comprising a polyoxyalkylenepolyamine-maleic anhydride condensation product having thioureide, ureide or thioformamide or formamide end groups.

17. The resin of claim 16 wherein said primary amine-containing curing agent is present in about a stoichiometric amount and said anhydride additive is present in amounts from about 2 to 40 parts by weight based on 100 parts by weight of said polyepoxide.

18. In an epoxy resin composition, being the cured product of a curable admixture comprising a vicinal polyepoxide having an average of at least 1.8 reactive epoxy groups per molecule; and, a curing amount of a polyamine curing agent having at least 3 reactive amino hydrogens, the improvement which comprises:
increasing the adhesion properties of said cured product by addition of an effective amount of a succinimide additive comprising a polyoxyalkylenepolyamine-maleic anhydride condensation product having thioureide, ureide or thioformamide or formamide end groups.

19. The method of claim 18 wherein the succinimide additive is of the formula:

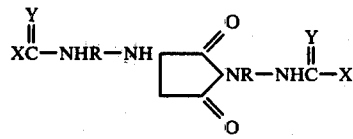

where
Y is S or O
X is $NH_2$ or H and
R is a polyoxyalkylene radical.

* * * * *